US012566698B2

(12) United States Patent
Hwang

(10) Patent No.: US 12,566,698 B2
(45) Date of Patent: Mar. 3, 2026

(54) STORAGE SYSTEM AND OPERATING METHOD OF OF MAPPING CONVERSION BASED ON AVERAGE LENGTH OF EXTENTS ALLOCATED TO MAPPING TREE

(71) Applicant: SAMSUNG ELECTRONICS CO., LTD., Suwon-si (KR)

(72) Inventor: Joo Young Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/901,853

(22) Filed: Sep. 30, 2024

(65) Prior Publication Data

US 2025/0245166 A1 Jul. 31, 2025

(30) Foreign Application Priority Data

Jan. 29, 2024 (KR) ........................ 10-2024-0013202

(51) Int. Cl.
*G06F 12/02* (2006.01)

(52) U.S. Cl.
CPC .. *G06F 12/0246* (2013.01); *G06F 2212/7201* (2013.01)

(58) Field of Classification Search
CPC .................... G06F 12/0246; G06F 2212/7201
See application file for complete search history.

(56) References Cited

U.S. PATENT DOCUMENTS

| | | | |
|---|---|---|---|
| 8,412,881 B2 | 4/2013 | Boyle | |
| 8,495,280 B2 | 7/2013 | Kang et al. | |
| 8,504,792 B2 | 8/2013 | Tamura et al. | |
| 8,756,396 B1 | 6/2014 | Pruthi et al. | |
| 9,652,265 B1 | 5/2017 | Narayanasamy et al. | |
| 11,003,547 B2 | 5/2021 | Kuang et al. | |
| 11,138,185 B1 | 10/2021 | Kuang et al. | |
| 11,288,204 B2 | 3/2022 | Gerhart et al. | |
| 11,733,894 B2 | 8/2023 | Jain et al. | |
| 2014/0122774 A1* | 5/2014 | Xian ................... G06F 12/0246 |
| | | | 711/E12.008 |
| 2020/0065408 A1* | 2/2020 | Desai ...................... G06F 16/13 |
| 2022/0391094 A1 | 12/2022 | Jain et al. | |

FOREIGN PATENT DOCUMENTS

KR 10-2014-0116617 B1 10/2014

OTHER PUBLICATIONS

European Extended Search Report issued Feb. 26, 2025 by the European Patent Office for EP Patent Application No. 24208857.3.

* cited by examiner

*Primary Examiner* — Chie Yew
(74) *Attorney, Agent, or Firm* — Sughrue Mion, PLLC

(57) ABSTRACT

A method for operating a storage system including a storage includes calculating an average length of extents allocated to a logical address region corresponding to a particular node of an address mapping tree, the address mapping tree being associated with the storage, and a mapping information format of the particular node being a first format and, based on the average length, converting the mapping information format of the particular node from the first format to a second format.

20 Claims, 12 Drawing Sheets

31

[EXTENT FORMAT]

41

[PAGE FORMAT]

STORAGE SYSTEM AND OPERATING METHOD OF OF MAPPING CONVERSION BASED ON AVERAGE LENGTH OF EXTENTS ALLOCATED TO MAPPING TREE

CROSS-REFERENCE TO RELATED APPLICATION

This application claims priority to Korean Patent Application No. 10-2024-0013202, filed on Jan. 29, 2024, in the Korean Intellectual Property Office, the disclosure of which being incorporated by reference herein in its entirety.

BACKGROUND

Systems, methods, and computer readable storage media consistent with the present disclosure relate to a storage system and an operating method thereof and, more particularly, to a storage system that adaptively converts a format of address mapping information depending on workload characteristics injected into a storage, and an operating method thereof.

An extent-based address mapping scheme is a scheme for managing mapping information between logical addresses and physical addresses on an extent basis. Here, the extent means a page set or collection made up of consecutive pages on a logical address space.

The extent-based address mapping scheme is known to be more efficient than the page-based mapping scheme in terms of memory cost. This increased efficiency is because, although a size of an extent entry (i.e., one unit of mapping information) is larger than a page entry (e.g., the extent entry further includes fields such as, for example, the logical page number of a start page, and an extent length), a total number of entries for the extent address mapping is typically smaller than a total number of entries for the page-based mapping scheme.

However, in some cases, a memory cost required for the extent-based address mapping scheme may exceed a memory cost of the page-based address mapping scheme.

SUMMARY

It is an aspect to provide a storage system that may efficiently manage mapping information between logical addresses and physical addresses, and a method for operating the same.

It is another aspect to provide a method that may reduce the cost of format conversion of address mapping information.

It is yet another aspect to provide a method that may accurately determine a threshold for format conversion of address mapping information.

It is another aspect to provide a method for processing requests (e.g., write, and read requests) of a storage client.

It is yet another aspect to provide a processing method according to operation (e.g., insertion, deletion, node splitting, etc.) of the address mapping tree.

According to an aspect of one or more embodiments, there is provided a storage system comprising one or more processors; and a storage that is implemented as a non-volatile memory and that stores one or more computer programs. At least one of the one or more processors accesses the storage and executes the one or more computer programs to cause the at least one of the one or more processors to perform an average length calculation of an average length of extents allocated to a logical address region corresponding to a particular node of an address mapping tree, the address mapping tree being associated with the storage, and a mapping information format of the particular node being a first format. At least one of the one or more processors accesses the storage and executes the one or more computer programs to cause the at least one of the one or more processors to perform a format conversion based on the average length, the format conversion converting the mapping information format of the particular node from the first format to a second format.

According to another aspect of one or more embodiments, there is provided a method for operating a storage system including a storage, the method comprising calculating an average length of extents allocated to a logical address region corresponding to a particular node of an address mapping tree, the address mapping tree being associated with the storage, and a mapping information format of the particular node being a first format and, based on the average length, converting the mapping information format of the particular node from the first format to a second format.

According to yet another aspect of one or more embodiments, there is provided a non-transitory computer-readable storage medium configured to store instructions which, when executed by one or more processors, cause the one or more processors to at least calculate an average length of extents allocated to a logical address region corresponding to a particular node of an address mapping tree, the address mapping tree being associated with a storage cooperating with the one or more processors, and a mapping information format of the particular node being a first format, and convert, based on the average length, the mapping information format of the particular node from the first format to a second format.

BRIEF DESCRIPTION OF THE DRAWINGS

The above and other aspects will become more apparent by describing in detail example embodiments thereof with reference to the attached drawings, in which.

DETAILED DESCRIPTION

Figure 1:
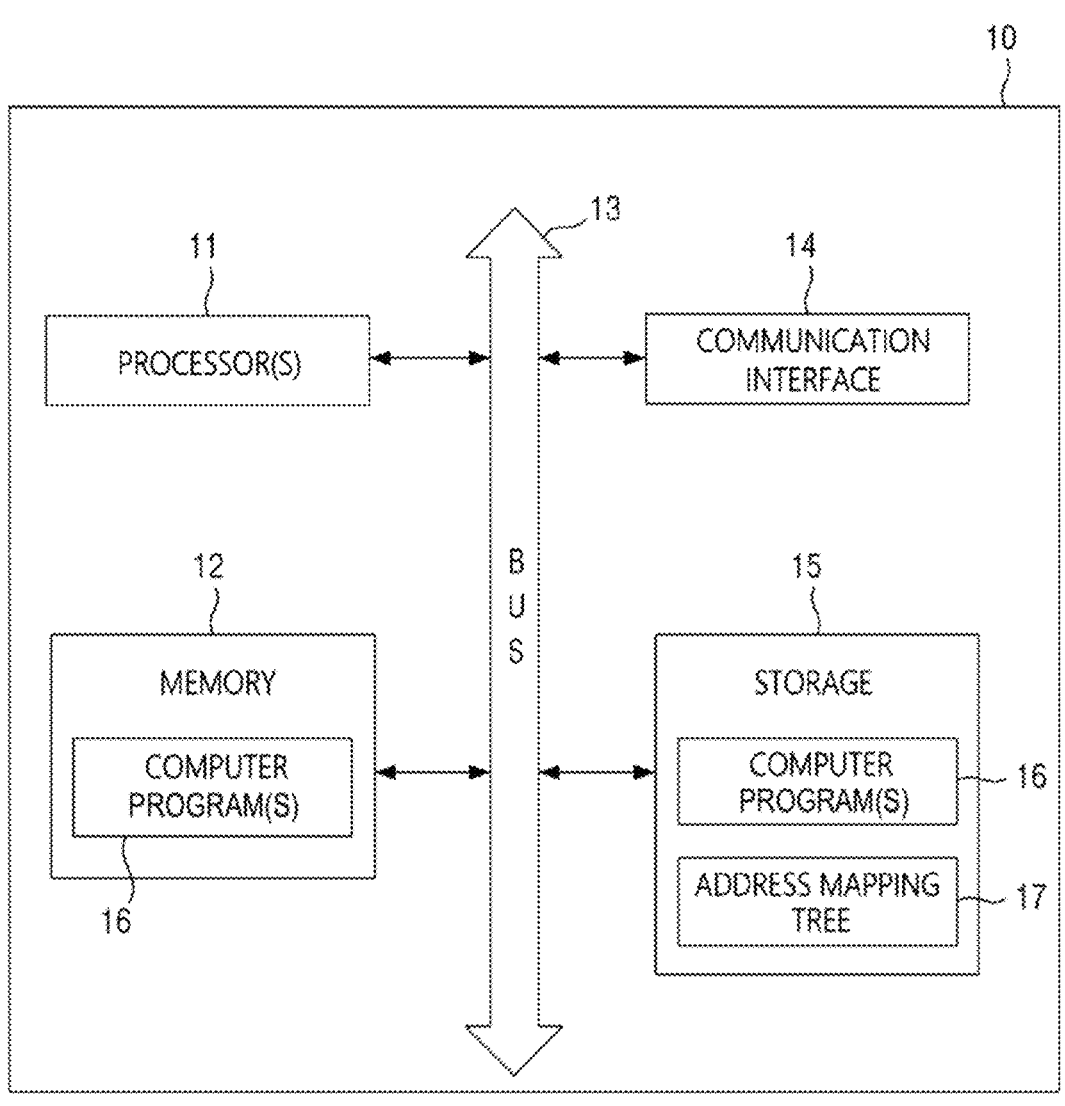
FIG. 1 is an example configuration diagram showing a storage system according to some embodiments.

As described above, in some cases, the memory cost for the extent-based address mapping scheme may exceed the memory cost of the page-based address mapping scheme. For example, the memory cost for the extend-based address mapping scheme may exceed the memory cost of the page-based address mapping scheme, depending on the characteristics of the workload injected into the storage. For example, in a workload environment in which a random write frequently occurs, the memory cost of the extent-based address mapping scheme may exceed that of the page-based address mapping scheme due to a storage region or due to a fragmentation phenomenon of the storage region.

Hereinafter, example embodiments will be described with reference to the attached drawings. Advantages and features of the present disclosure and methods of accomplishing the same may be understood more readily by reference to the following detailed description of various example embodiments and the accompanying drawings. The technology may, however, be embodied in many different forms and should not be construed as being limited to the various embodiments set forth herein. Rather, the various embodiments are provided so that the disclosure will be thorough and complete and will fully convey the concept of the technology to those skilled in the art, and the present disclosure will only be defined by the scope of the appended claims.

In adding reference numerals to the components of each drawing, it should be noted that the same reference numerals are assigned to the same components as much as possible even though the components are shown in different drawings. In addition, in describing the present disclosure, when it is determined that the detailed description of the related well-known configuration or function may obscure the gist of the present disclosure, the detailed description thereof may be omitted for conciseness.

Unless otherwise defined, all terms used in the present specification (including technical and scientific terms) may be used in a sense that may be commonly understood by those skilled in the art. In addition, the terms defined in commonly used dictionaries are not ideally or excessively interpreted unless they are specifically defined clearly. The terminology used herein is for the purpose of describing particular embodiments only and is not intended to be limiting of the disclosure. In this specification, the singular also includes the plural unless specifically stated otherwise in the phrase.

In addition, in describing the component of this disclosure, terms, such as "first", "second", A, B, (a), (b), may be used. These terms are only for distinguishing the components from other components, and the nature or order of the components is not limited by the terms. In other words, a "first" component may be referred to as a "second" component and vice-versa. If a component is described as being "connected," "coupled" or "contacted" to another component, that component may be directly connected to or contacted with that other component, but it should be understood that another component also may be "connected," "coupled" or "contacted" between each component.

Components described with reference to terms such as a part, a unit, a module, a block, ~or, and ~er used in the following embodiments and functional blocks shown in the drawings may be implemented in the form of software, hardware or a combination thereof. The software may be, for example, machine code, firmware, embedded code, and/or application software. Further, the hardware may include processing circuitry, for example, an electrical circuit, an electronic circuit, a processor, a computer, an integrated circuit, integrated circuit cores, passive elements, or combinations thereof.

Hereinafter, various embodiments will be described in detail with reference to the accompanying drawings.

FIG. 1 is an example configuration diagram schematically showing a storage system 10 according to some embodiments. The storage system 10 may be named a "storage device", or a "computing device/system", in some cases.

As shown in FIG. 1, the storage system 10 may be configured to include one or more processors 11, a bus 13, a communication interface 14, a memory 12 into which one or more computer programs 16 are loaded so as to be executed by the one or more processors 11, and a storage 15 that stores the one or more computer programs 16. In the description that follows the one or more processors 11 will be described with reference to "the processor 11" for convenience and "the processor 11" is intended to refer to include within its scope one processor 11 or more than one processor 11. It is noted that, FIG. 1 shows only components associated with various embodiments. Therefore, it will be appreciated by those skilled in the technical field to which the present disclosure pertains that other components (e.g., an input/output device, a display device, and/or a caching module (101 of FIG. 10) may be further included in the storage system 10. That is, in some embodiments, the storage system 10 may further include various components in addition to the components shown in FIG. 1. Furthermore, in some cases, the storage system 10 may be configured with some of the components shown in FIG. 1 omitted. That is, in some embodiments, some of the components illustrated in FIG. 1 may be omitted. Each component of the storage system 10 illustrated in FIG. 1 will be explained below.

The processor 11 may control the overall operation of each component of the storage system 10. The processor 11 may be configured to include at least one of a CPU (Central Processing Unit), an MPU (Micro Processor Unit), an MCU (Micro Controller Unit), a GPU (Graphic Processing Unit) or any form of processor (or controller) that is well known in the technical field of the present disclosure. As described above, the storage system 10 may include one or more processors.

The processor 11 may collectively refer to any software/hardware module equipped with a processing/computing function. For example, a module (e.g., 101 of FIG. 10) that performs a caching function between the memory 12 and the storage 15 may also be included in the category of the processor 11. In some embodiments, a module that converts the mapping information format of the address mapping tree 17, a module that performs address conversion by referring to the address mapping tree 17, and/or the like may also be included in the category of the processor 11.

The processor 11 may perform steps/operations/methods according to the various embodiments by executing one or more computer programs 16 loaded into the memory 12. That is, the one or more computer programs 16 that are stored in the storage 15 may be loaded into the memory 12 and the processor 11 may access the memory 12 to execute the one or more computer programs 16 to cause the processor 11 to implement various steps/operations/methods. For example, the processor 11 may perform the steps/operations shown in FIG. 5 (e.g., format conversion of address mapping information, etc.) by executing the computer program 16. Accordingly, the mapping information format of the address mapping tree 17 may be adaptively converted depending on the workload characteristics of the storage client (e.g., application, tenant, etc.), and memory costs for managing the address mapping tree 17 may be reduced. This configuration and operation will be explained in detail later with reference to the drawings after FIG. 5.

The memory 12 stores various data, instructions and/or information. As described above, the memory 12 may load the one or more computer programs 16 from the storage 15 such that when the one or more computer programs 16 are executed by the processor 11, the processor 11 is caused to perform steps/operations/methods according to various embodiments. In an embodiment, the memory 12 may be implemented as a volatile memory such as RAM.

The bus 13 provides a communication function between components of the storage system 10. The bus 13 may be implemented by various types of buses such as an address bus, a data bus, and/or a control bus.

The communication interface 14 supports wired and wireless Internet communications for the storage system 10. The communication interface 14 may further support various communication schemes other than Internet communication. The communication interface 14 may be configured to include various communication modules used in storage system technology.

The storage 15 non-temporarily stores various data, instructions and/or information. For example, the storage 15 may store the one or more computer programs 16, the address mapping trees 17, and the like. The address mapping tree 17 denotes address mapping information of a tree structure used for address conversion (that is, converting a logical address into a physical address) associated with the storage 15, and this configuration and operation will be described below. The address mapping tree 17 may be named an "address conversion tree" or the like in some cases.

The storage 15 may be implemented as a non-volatile memory such as a ROM (Read Only Memory), an EPROM (Erasable Programmable ROM), an EEPROM (Electrically Erasable Programmable ROM), a flash memory, a hard disk, and/or a detachable disk. In some embodiments, the storage 15 may be configured to include any form of non-transitory computer-readable storage medium used in storage system technology.

The one or more computer programs 16 may include instructions which cause the processor 11 to perform the steps/operations/methods according to various embodiments, when loaded into the memory 12. That is, the processor 11 may perform the steps/operations/methods according to various embodiments by executing the instructions loaded into the memory 12.

For example, the one or more computer programs 16 may include instructions which cause the processor 11 (e.g., at least one of the one or more processors) to perform an operation of calculating the average length of extents allocated to the logical address region corresponding to a particular node of the address mapping tree 17, and the one or more computer programs 16 may include instructions which cause the processor 11 (e.g., at least one of the one or more processors) to perform an operation of converting mapping information format of the particular node on the basis of the calculated average length. Here, the extent denotes a set or collection of pages consecutively allocated to a logical address region (i.e., logical storage region) and/or a physical address region (i.e., physical storage region).

As another example, the one or more computer programs 16 may include instructions that cause the processor 11 to perform at least some of the steps/operations/methods described with reference to FIGS. 1 to 14. According to an embodiment, at least one of the one or more processors perform one of the steps/operations/methods. According to an embodiment, at least one of the one or more processors may perform multiples ones of the steps/operations/methods. That is, the present disclosure contemplates one processor executing the steps/operations/methods on a one-to-one basis, or on a one to plural basis.

In some embodiments, the storage system may refer to a system (e.g., a cloud storage system) comprising a plurality of storage devices (e.g., 10). For example, a storage system may be a system that provides a cloud storage service to a plurality of tenants by using the plurality of storages (e.g., 15). In this case, the storage system may adaptively convert the mapping information format of the address mapping tree 17 depending on the workload characteristics of the tenant (that is, the cloud service client of tenant).

The schematic configuration of the storage system 10 according to some embodiments has been described above with reference to FIG. 1. Hereinafter, prior to a description of the method for operating the storage system 10, the address mapping tree 17 and mapping information formats that may be referred in various embodiments of this disclosure will be explained first for the convenience of understanding.

Figure 2:
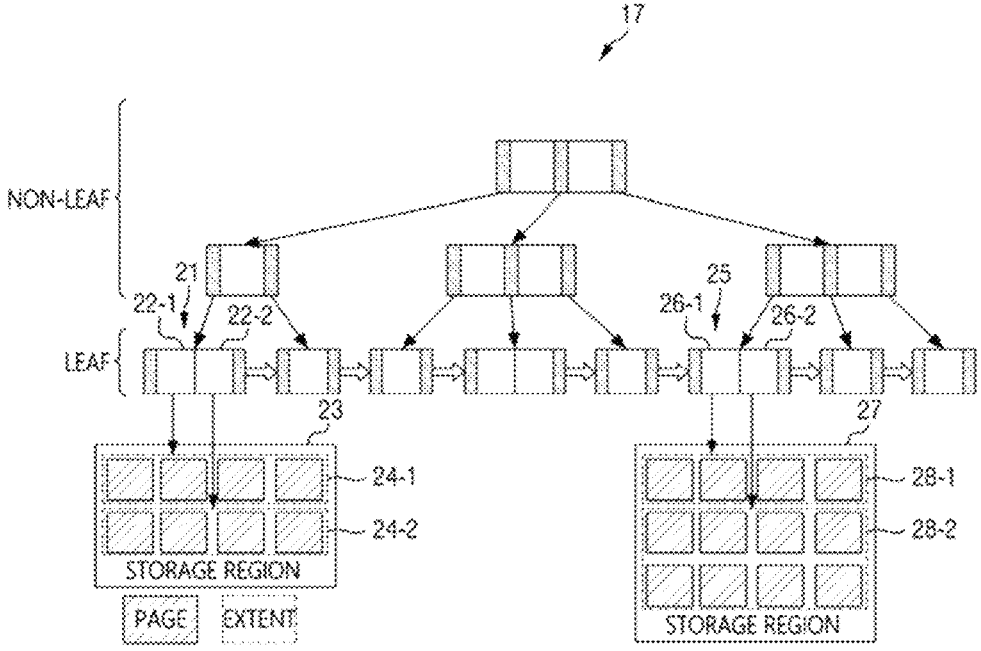
FIG. 2 shows an example of an address mapping tree.

FIG. 2 shows an example of an address mapping tree 17. FIG. 2 shows a case in which the address mapping tree 17 is implemented as a "B+ tree". However, the scope of the present disclosure is not limited thereto, and the address mapping tree 17 may be implemented as other forms of trees.

As shown in FIG. 2, the address mapping tree 17 is made up of non-leaf nodes and leaf nodes. It is understood that the address mapping tree 17 is a sorting tree based on the logical address information (e.g., logical page number (LPN)). Those skilled in the art will be aware of the structure of B+ trees, and therefore an explanation of constraints (e.g., conditions to be observed to maintain the structure of B+ trees), and operations (e.g., insertions, deletions, etc.) are omitted for conciseness.

The non-leaf node includes one or more entries, and the maximum number of entries may be determined on the basis of the degree of the address mapping tree 17. FIG. 2 shows a case in which the address mapping tree 17 is implemented as a B+ tree with degree "3". The entry of the non-leaf node includes a key field, and, for example, logical address information (e.g., logical page number) of the page may be stored in the key field. In some embodiments, the non-leaf node may further store pointer information indicating a child node.

The leaf nodes (e.g., 21) also include one or more entries, and the maximum number of entries may be determined on the basis of the degree of the address mapping tree 17. The leaf node entries may store extent or page-based address mapping information (hereinafter sometimes abbreviated as "mapping information"), and the format of the information may vary depending on whether the information is an extent-based format (or a page-based format).

If the mapping information format of the leaf node is the extent-based format, the entry may include a key field and a record field. The key field may store, for example, the logical address information of the start page of the extent (i.e., the first logical page), and the record field may store the physical address information of the start page of the extent and the length of the extent (i.e., number of consecutive pages). This configuration and operation will be explained later with reference to FIGS. 3 and 4. FIG. 2 shows a case in which the mapping information format of the leaf nodes (e.g., 21, 25) is "extent-based".

Hereinafter, for convenience of explanation, the extent-based mapping information format will be abbreviated as "extent format" and the page-based mapping information format will be abbreviated as "page format". In FIG. 2 and subsequent drawings, the names of mapping formats are indicated by abbreviations.

As shown in FIG. 2, the sizes of the storage regions (e.g., 23, 27) (or logical address regions) corresponding to the leaf nodes (e.g., 21, 25) may be dynamically (i.e., variably) determined. For example, the size of the storage region 23 (or logical address region) corresponding to the leaf node 21 may be determined to be different from the size of the storage region 27 (or logical address region) corresponding to other leaf nodes 25. This difference in size may be understood to be due to the fact that extent (e.g., 24-1) is dynamically allocated and/or released according to storage client requests. That is, the size of the storage region (e.g., 23) (or logical address region) covered by the particular leaf node (e.g., 21) may be dynamically determined by the allocation process of the extents (e.g., 24-1, 24-2). FIG. 2 shows a case in which the address mapping information of extents 24-1 and 24-2 allocated to the particular region 23 of the storage 15 is stored in the entries 22-1 and 22-2 of the leaf node 21, and address mapping information of extents 28-1 and 28-2 allocated to other regions 27 of the storage 15 is stored in entries 26-1 and 26-2 of other leaf nodes 25.

The extent format and page format that may be referred in various embodiments of the present disclosure will be described below with reference to FIGS. 3 and 4.

Figure 3:
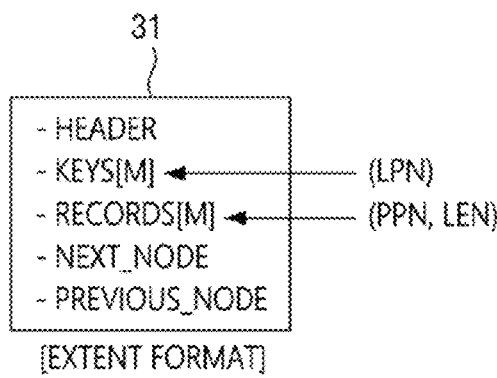
FIGS. 3 and 4 are example diagrams for explaining a mapping information format of a node.

FIG. 3 shows an example of an extent format 31, according to some embodiments. FIGS. 3 and 4 show mapping information formats for one leaf node.

As shown in FIG. 3, the extent format 31 may be configured to include fields such as a header, a key, and/or a record. In some embodiments, the extent format 31 may be configured to further include a pointer-related field (see "NEXT_NODE", "PREVIOUS_NODE") indicating sibling nodes. Here, it may be understood that one key field and one record field constitute one entry. In some cases, the entry of the extent format 31 may be named an "extent entry."

The header may include a flag field (e.g., flag bit) indicating whether the format conversion is performed. In some embodiments, the header may further include field/information such as a number of pre-allocated extents, and a size of a logical address region (or storage region).

The key field may store logical address information (e.g., logical page number) of the start (first) page of the extent as described above.

The record field may store the physical address information (e.g., physical page number (PPN)) of the start page of the extent and the length of the extent (i.e., the number of consecutive pages).

Figure 4:
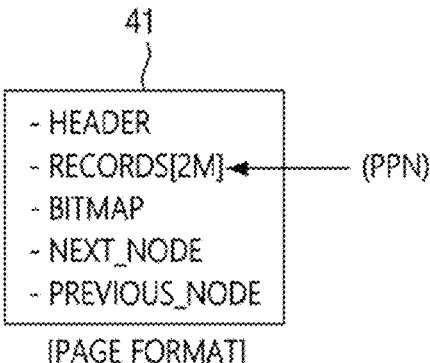

FIG. 4 shows an example of the page format 41 according to some embodiments.

As shown in FIG. 4, the page format 41 may be configured to include fields such as a header, a record, and/or a bitmap. In some embodiments, the page format 41 may be configured to further include a pointer-related field (see "NEXT_NODE" and "PREVIOUS_NODE") indicating the sibling nodes. Here, it may be understood that one record field constitutes one entry. In some embodiments, entry of the page format 41 may be named "page entry."

The header may include a flag field (e.g., flag bit) indicating whether the format conversion is performed. In some embodiments, the header may further include fields/information such as logical address information of the first page of the logical address region (e.g., logical page number), and a size of the logical address region (or storage region).

The record field may store physical address information (e.g., physical page number) of the page. For example, physical address information on each page of the logical address region covered by a particular leaf node may be stored in each record field. The plurality of record fields (or entries) may be understood to be implemented as data structures (e.g., tables/arrays) that support direct/random access (e.g., the processor 11 may access record fields by using the logical page number as an index to acquire the physical page number for the page).

Bitmaps are data structures and metadata for managing page validity information. For example, the bitmap may be understood as a collection of bits that indicate the validity of each page of the logical address region covered by a particular leaf node.

The processor 11 of the storage system 10 may perform format conversion between the extent format 31 shown in FIG. 3 and the page format 41 shown in FIG. 4. For example, the processor 11 may convert the format of the address mapping information into the page format 41 within a memory space (e.g., a current memory space, a maximum memory space, etc.) occupied by the address mapping information of the extent format 31. If the size of the memory space occupied by the address mapping information of the page format 41 exceeds the size of the address mapping information of the extent format 31, the processor 110 may defer the format conversion until a later specific point in time. A method in which the processor 11 performs the format conversion will be described below in detail with reference to FIG. 5 and subsequent drawings.

The address mapping tree 17 and the mapping information format have been described above with reference to FIGS. 2 to 4. Hereinafter, various methods for operating the storage system 10 will be explained with reference to FIG. 5 and subsequent drawings.

Hereinafter, for convenience of understanding, the explanation will be given based on the assumption that the address mapping tree 17 is implemented as a "B+ tree" as shown in FIG. 2, and that the processor 11 of the storage system 10 executes the methods to be described below. Accordingly, if the subject of a particular step/operation is omitted, it may be understood to be performed by the processor 11. However, in some cases, some steps/operations of the methods to be described below may be performed by other modules.

Figure 5:
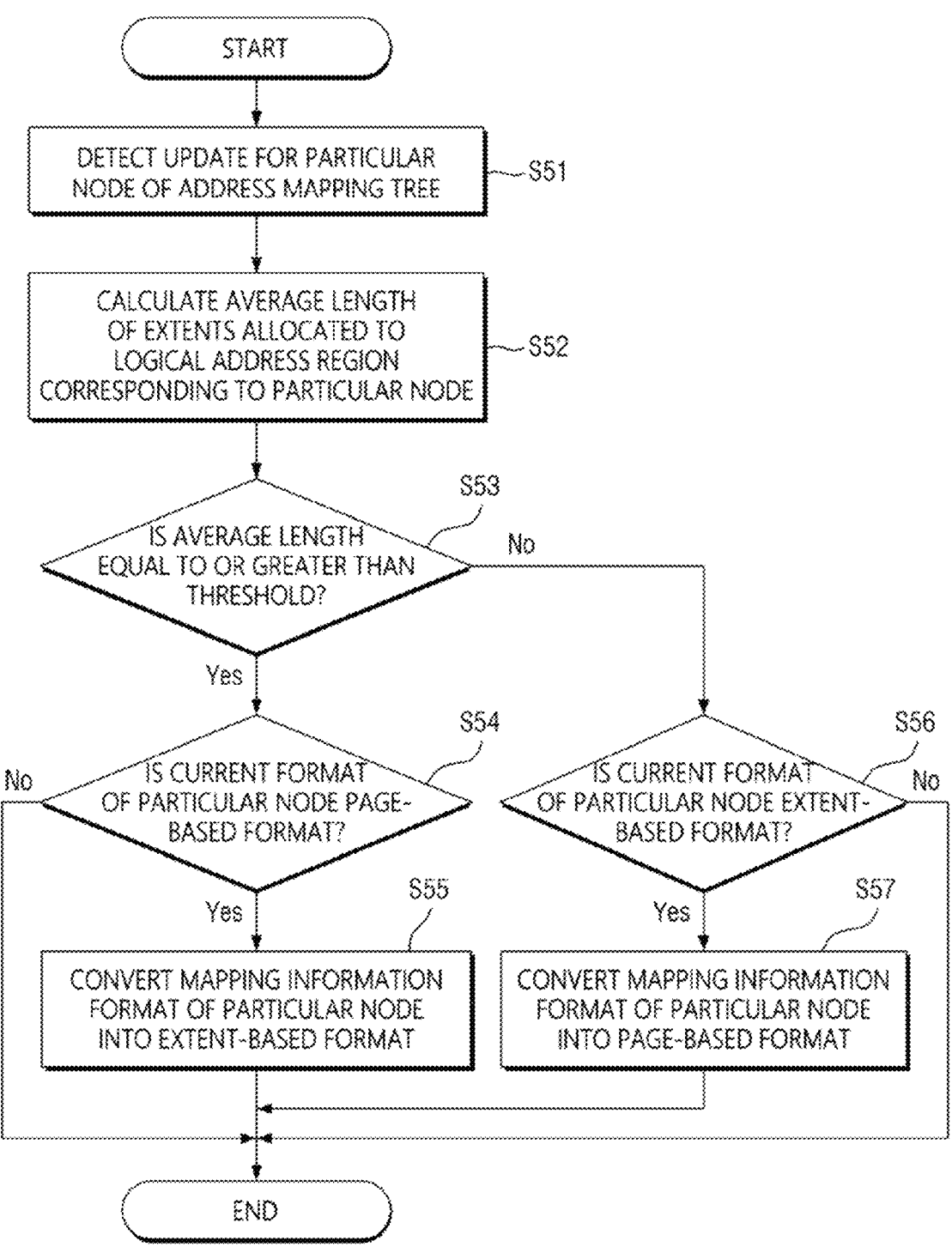
FIG. 5 is an example flowchart showing a method for operating a storage system according to some embodiments.

FIG. 5 is an example flowchart showing a method for operating the storage system 10 according to some embodiments. However, this flowchart is only an example embodiment and, in some embodiments, some operations may be added or deleted. FIG. 5 shows the method for operating the storage system 10 associated with the conversion of the mapping information format, according to some embodiments.

As shown in FIG. 5, the operating method may start with operation S51 of detecting an update to a particular node (e.g., a leaf node) of the address mapping tree 17. For example, the processor 11 may determine that the address mapping information stored in a particular leaf node of the address mapping tree 17 is updated. Update of the address mapping information may occur in the process of processing requests (e.g., write, read, delete requests, etc.) of the storage client. For example, when a new extent is allocated by a sequential write request of the storage client, an entry including the address mapping information for the new extent may be inserted into a particular leaf node.

The storage client is a module that uses the storage 15, and may be, for example, an application mounted on the storage system 10, a module that uses the storage 15 outside the storage system 10 (e.g., a cloud service client of tenant), and/or the like. However, embodiments are not limited thereto.

In some embodiments, an update to a particular node may include a case in which an entry of the new extent is inserted into a particular node when the particular node is in a full state. Here, the case in which a particular node is in a full state denotes a case in which the number of entries of the particular node is a maximum number (e.g., degree of B+ tree−1). The maximum number may be preset. In this case, the processor 11 may defer the splitting (or division) of the particular node and convert the mapping information format of the particular node from the extent format into the page format (if the condition of operation S53 is satisfied). Accordingly, the processing cost for node splitting (or division) and format conversion may be reduced. Otherwise, the processing cost for node splitting (or division) may be reduced by deferring the node splitting (or division) until a later specific point in time. By performing the format conversion only on the nodes of the full state, it is possible to reduce the frequency of format conversion and the processing cost due to format conversion.

In operation S52, an average length of extents allocated to the logical address region (or storage region) corresponding to the particular node is calculated. Here, the reason for calculating the average length of extents may be understood due to the fact that the average extent length is a measure that accurately indicates the degree of fragmentation of the corresponding logical address region (or storage region). The processor 11 may calculate the average extent length on the basis of the size of the logical address region corresponding to a particular node and the number of extents allocated to the logical address region. However, the specific method for calculating the size of the logical address region and/or the number of extents may vary depending on the embodiment.

Figure 6:
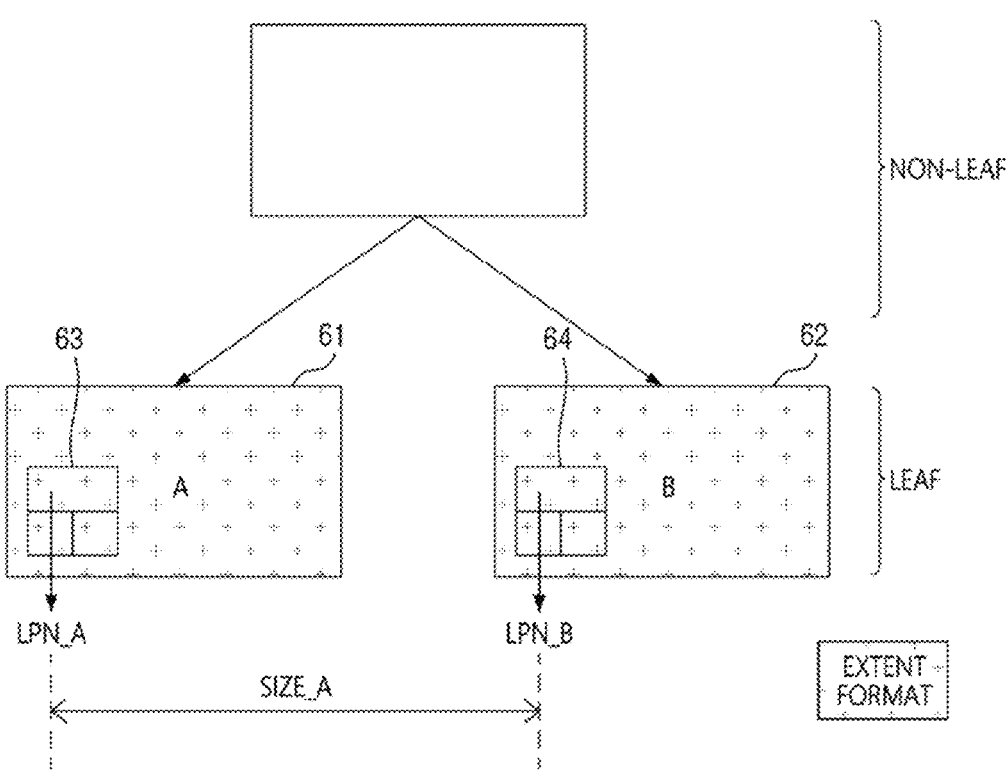
FIGS. 6 and 7 are example diagrams for explaining an operation of calculating an average length of extents shown in the method of FIG. 5, according to some embodiments.

In some embodiments, the processor 11 may calculate the size of the logical address region on the basis of the difference between the logical address information of the first entry of a particular node and the logical address information of the first entry of the sibling node (here, the particular node is a node of the extent format). For example, as shown in FIG. 6, the processor 11 may calculate a size (SIZE_A) of the logical address region, on the basis of a difference between the logical page number (LPN_A, that is, the logical page number of the start page of the first extent) stored in the first entry 63 of the particular node 61 and the logical page number (LPN_B) stored in the first entry 64 of the sibling node 62. For reference, a rectangular upper column representing the entry (e.g., 63) of extent format of FIG. 6 and subsequent drawings denotes a key field (i.e., logical address field), and the lower two columns denote a record field (i.e., physical address and length field).

In some embodiments, the processor 11 may calculate the size of the logical address region on the basis of the logical address information of the first entry of the particular node, and the logical address information and extent length information of the last entry (here, the particular node is the node of extent format). For example, the processor 11 may derive the logical page number of the last page of the last extent, by adding the extent length to the logical page number of the last entry of a particular node (i.e., the logical page number of the start page of the last extent). The processor 11 may then calculate the size of the logical address region, on the basis of the difference between the derived logical page number and the logical page number of the first entry (that is, the logical page number of the start page of the first extent).

In some embodiments, the processor 11 may calculate the number of extents allocated to the logical address region of a particular node according to the number of entries (or number of keys) included in the particular node (here, the particular node is the node of page format).

Figure 7:
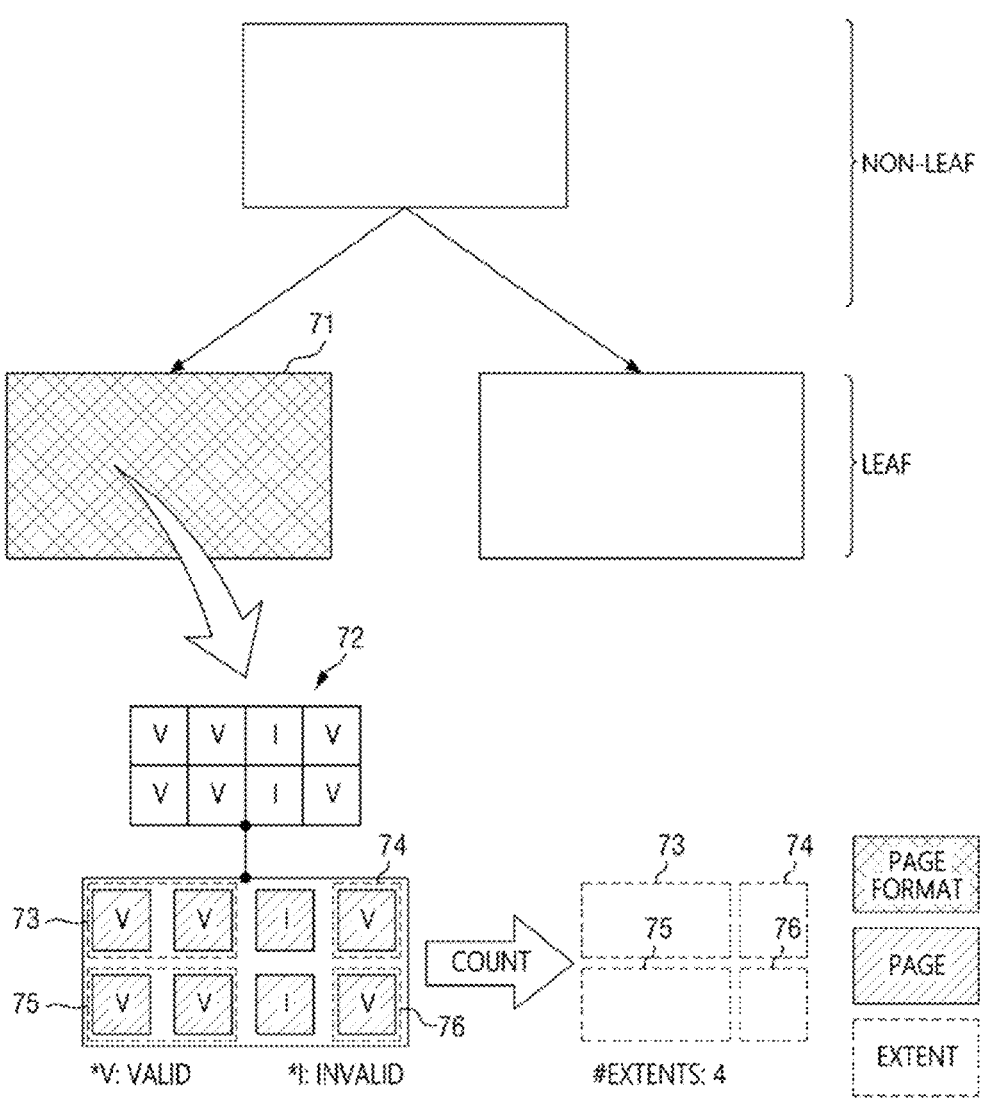

In some embodiments, the processor 11 may determine the number of extents, by counting the number of page sets having consecutive valid pages, by using bitmap information of a particular node (here, the particular node is a node of page format). For example, as shown in FIG. 7, the processor 11 may determine and count the page sets 73 to 76 made up of consecutive valid pages, by using the bitmap 72 of the particular node 71. In some embodiments, the processor 11 may determine a page set made up of consecutive valid pages in the physical address space, by further using the physical address information of the pages stored in the entries of the particular node. The processor 11 may then count the number of determined page sets to determine the number of extents.

In some embodiments, the size and number of extents of the logical address region may be calculated on the basis of various combinations of the above-described embodiments.

Returning to FIG. 5, in operation S53, it is determined whether the average length of the extents is equal to or greater than a threshold. When the average length is equal to or greater than the threshold (i.e., operation S53, Yes), operation S54 is performed, and when the average length is less than the threshold (i.e., operation S53, No), operation S56 is performed.

The threshold may be a reference value for determining which one of the extent format and the page format is more efficient. In some embodiments, the threshold may be a fixed value set in advance. In some embodiments, the threshold may be a value that fluctuates depending on the situation. For example, the threshold may be a fixed value that is determined in advance on the basis of the entry size of the extent format (e.g., size of address mapping information for individual extents) and/or the entry size of page format (e.g., size of address mapping information for individual pages). In such a case, the reference value for determining which of the two formats is more efficient may be accurately derived. As another example, the threshold may be adjusted (e.g., pre-adjusted, dynamically adjusted, etc.) on the basis of the request processing speed associated with the storage client. For example, when the storage client uses high request processing speeds, the threshold may be adjusted to be higher than an original threshold to increase the page format retention time of nodes (because page formats that support direct access may provide address conversion speed faster than an address conversion speed of the extent format). When the storage client uses low request processing speeds, the threshold may be adjusted to be lower than the original threshold.

In operation S54, it is determined whether the current format of the particular node is a page-based format. When the current format of the particular node is the page-based format (operation S54, Yes), in operation S55, the mapping information format of the particular node is converted (switched) into an extent format on the basis of the determination that the current format of the particular node is the page format. The case where the average length of the extents allocated to the logical address region (or storage region) corresponding to a particular node is equal to or greater than the threshold denotes that the degree of fragmentation of that region is not high, and thus, the processor 11 may reduce the memory costs, by converting the mapping information format of a particular node to an extent format. For example, the processor 11 may identify extents (e.g., a set of consecutive valid pages) allocated to the logical address region of a particular node, generate entries corresponding to each of the identified extents, and convert the mapping information format of the particular node into the extent format. When the current format of the particular node is not the page-based format (operation S54, No), the conversion may be deferred until a later specific point in time and the method may end.

In some embodiments, the processor 11 may set a value (information) indicating that the header of a particular node (see FIG. 4) is to use the format conversion on the basis of the determination that the current format of the particular node is the page format. Further, the processor 11 may perform the format conversion according to (information) that is set in the header at an appropriate time. For example, the processor 11 may perform the format conversion during a time at which the storage 15 processes the input/output requests (see FIG. 11), during an idle time, and/or during a time at which various conditions are satisfied. The various conditions may be predetermined. Accordingly, the format conversion may be performed more efficiently.

In operation S56, it may be determined whether the current format of the particular node is an extent-based format, and when the current format is the extent-based format (operation S56, Yes), in operation S57, the mapping information format of the particular node is converted (switched) into the page-based format, on the basis of the determination that the current format of the particular node is the extent format. The case where the average length of the extents allocated to the logical address region (or storage region) corresponding to a particular node is less than the threshold means that the degree of fragmentation of that region is high, and therefore, the processor 11 may reduce the memory costs by converting the mapping information format for the particular node into the page format. When the current format of the particular node is not the extent-based format (operation S56, No), the conversion may be deferred until a later specific point in time and the method may end.

Figure 8:
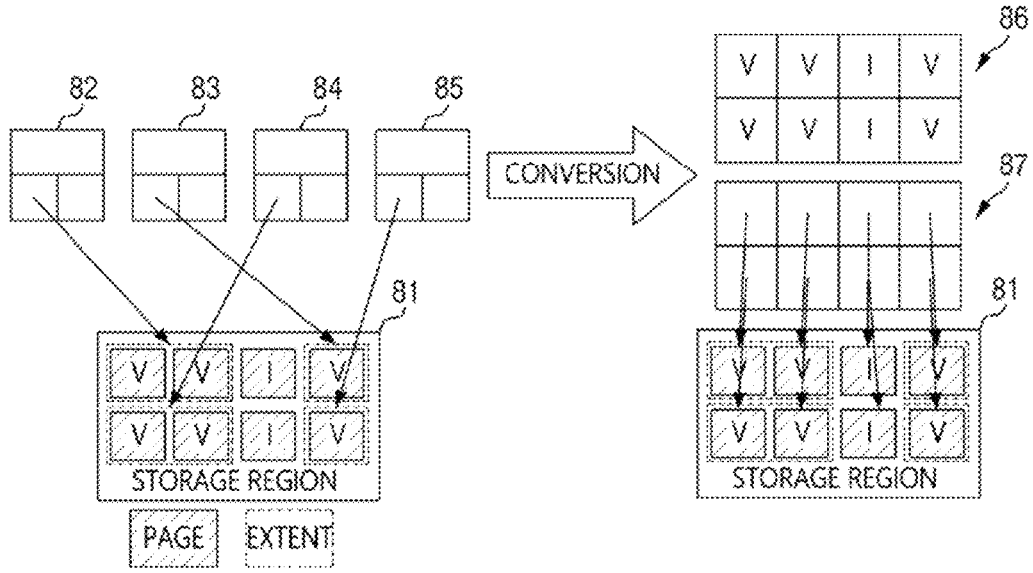
FIG. 8 is an example diagram for explaining an operation of converting into a page-based format shown in the method of FIG. 5, according to some embodiments.

For example, it is assumed that a particular node includes entries 82 to 85 for four extents, as shown in FIG. 8. For convenience of understanding, FIG. 8 assumes a case in which the storage region 81 (that is, the physical address region) has the same configuration as the logical address region. In such a case, the processor 11 may generate an entry 87 of the pages belonging to the logical address region (e.g., 81) corresponding to the particular node, and a bitmap 86 indicating the validity of that pages. Accordingly, the format of the particular node may be accurately converted into the page format.

For reference, the entries 87 shown in the table form in FIG. 8 and subsequent drawings denote entries of the page format that support direct access based on logical page numbers.

In some embodiments, the processor 11 may set a value (information) indicating that the header of a particular node (see FIG. 3) is to use format conversion on the basis of the determination that the current format of the particular node is an extent format. The processor 11 may then perform the format conversion according to the value (information) that is set in the header at an appropriate time. For example, the processor 11 may perform the format conversion during a time at which the storage 15 processes the input/output requests (see FIG. 11), during the idle time, and/or during a time when various conditions are satisfied. The various conditions may be predetermined. Accordingly, the format conversion may be performed more efficiently.

Although FIG. 5 only handles the format conversion for one node of the address mapping tree 17, it will be understood by those skilled in the art that the format conversion may be performed for each node that forms the address mapping tree 17. For example, the processor 11 may perform the format conversion on a first node that covers a first logical address region (or a first storage region), and may perform the format conversion on a second node that covers a second logical address region (or a second storage region), and so on.

FIG. 5 assumes a case in which an update of a particular node is set as a trigger condition for format conversion of the particular node. However, in some embodiments, the processor 11 may calculate the average extent length of a particular node periodically or aperiodically, and may determine whether to convert the format of the address mapping information on the basis of the calculation result. In some embodiments, the processor 11 may calculate the average extent length for a particular node on the basis of other trigger conditions.

The embodiment illustrated in FIG. 5 may be easily applied to an environment in which a plurality of mapping information formats exist or an environment in which other mapping information formats exist in addition to the extent format and the page format. For example, in an embodiment, the processor 11 may perform the format conversion (conversion) among a first format, a second format, and a third format, on the basis of a value of a metric (e.g., average length of an extent, etc.) that determines memory efficiency among the first format, the second format, and the third format.

The method for operating the storage system 10 according to some embodiments have been described above with reference to FIGS. 5 to 8. As described above, a mapping information format for the particular node may be adaptively converted, on the basis of the average length of extents allocated to the logical address region (or storage region) corresponding to a particular node (e.g., leaf node) of the address mapping tree 17. For example, if the average length of extents is equal to or greater than a threshold, the mapping information format of a particular node may be converted into the extent format, and if the average length of extents is less than the threshold, the mapping information format may be converted into the page format. In such a case, depending on the workload characteristics injected into a logical address region (or storage region), the mapping information format of the node which covers that region may be converted into an appropriate format (i.e., a format with less memory cost), and as a result, the overall memory cost to manage address mapping information may be significantly reduced.

Various embodiments related to a method for operating the storage system 10 will be described below with reference to FIGS. 9 to 14.

First, a method for operating the storage system 10 associated with constraints on the address mapping tree 17 will be described with reference to FIG. 9.

Figure 9:
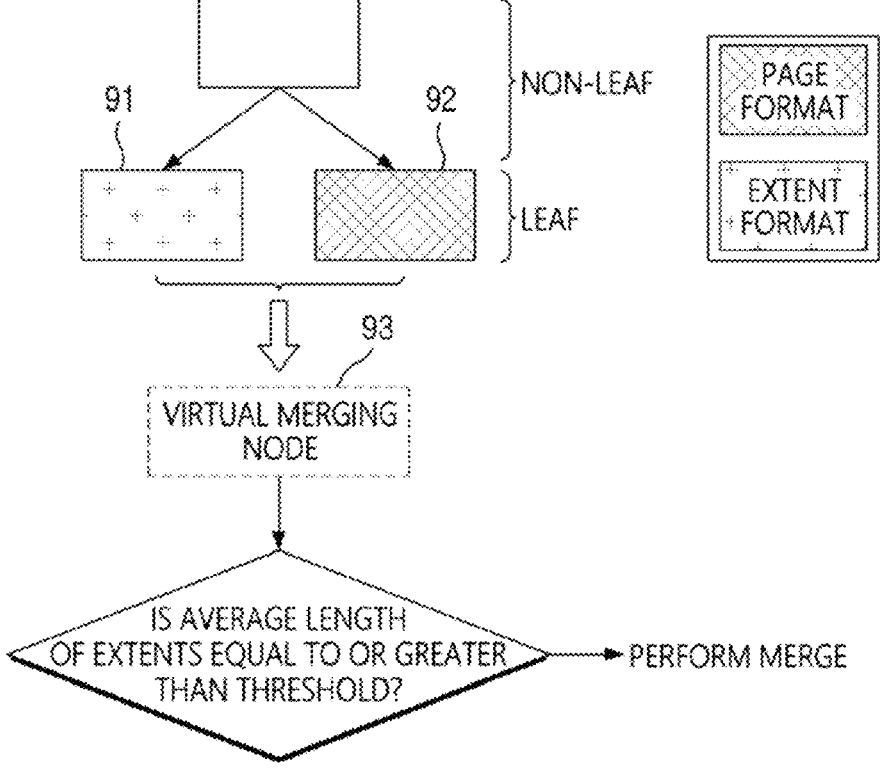
FIG. 9 is an example diagram showing a method for operating a storage system associated with node merging of address mapping tree according to some embodiments.

FIG. 9 is an example diagram for explaining a method for operating the storage system 10 in connection with node merging of the address mapping tree 17 according to some embodiments.

As shown in FIG. 9, there may be a case in which it is advantageous to perform merging between a first node 91 and a second node 92 having different mapping information formats due to constraints associated with the structure maintenance of the address mapping tree 17. Here, the second node 92 denotes a sibling node of the first node 91, and FIG. 9 shows a case in which the respective mapping information formats of the first node 91 and the second node 92 are "extent format" and "page format." A case in which it is advantageous to perform the node merging refers to the description of "B+ tree".

In such a case, the processor 11 may generate a virtual merging node 93 for the first node 91 and the second node 92, and may derive the average length of the extents allocated to the logical address region corresponding to the virtual merging node 93. The processor 11 may defer merging of the first node 91 and the second node 92, when the derived average length is less than the threshold. If the derived average length is equal to or greater than the threshold, the processor 11 may merge the first node 91 and the second node 92 to generate an actual merging node of the extent format. By doing so, the frequency of format conversions may be reduced, and the memory costs may be reduced as merged nodes begin with the extent format.

There may be a case in which it is advantageous to perform an entry movement (or borrowing) from the second node 92 to the first node 91 due to the constraints of the address mapping tree 17. For such a case, the description of "B+ tree" associated with borrowing of the node elements will be referred.

In such a case, the processor 11 may determine the extent of the second node 92 at the boundary between the first node 91 and the second node 92, generate an entry for that extent, and insert the generated entry into the first node 91.

More specifically, the processor 11 may determine the extent of the second node 92 located closest to the extent managed by the first node 91 (i.e., located closest to the boundary between the two nodes 91 and 92) on the basis of the mapping information (e.g., information of page entry, the bitmap or the like) (e.g., determine consecutive valid pages). Next, the processor 11 may generate an entry including address mapping information of the determine extent and insert the generated entry into the first node 91.

The operation of the storage system 10 associated with the constraints of the address mapping tree 17 has been described above with reference to FIG. 9. Hereinafter, a method for operating the storage system 10 associated with a case in which the capacity of the memory 12 is insufficient will be described with reference to FIGS. 10 and 11.

Figure 10:
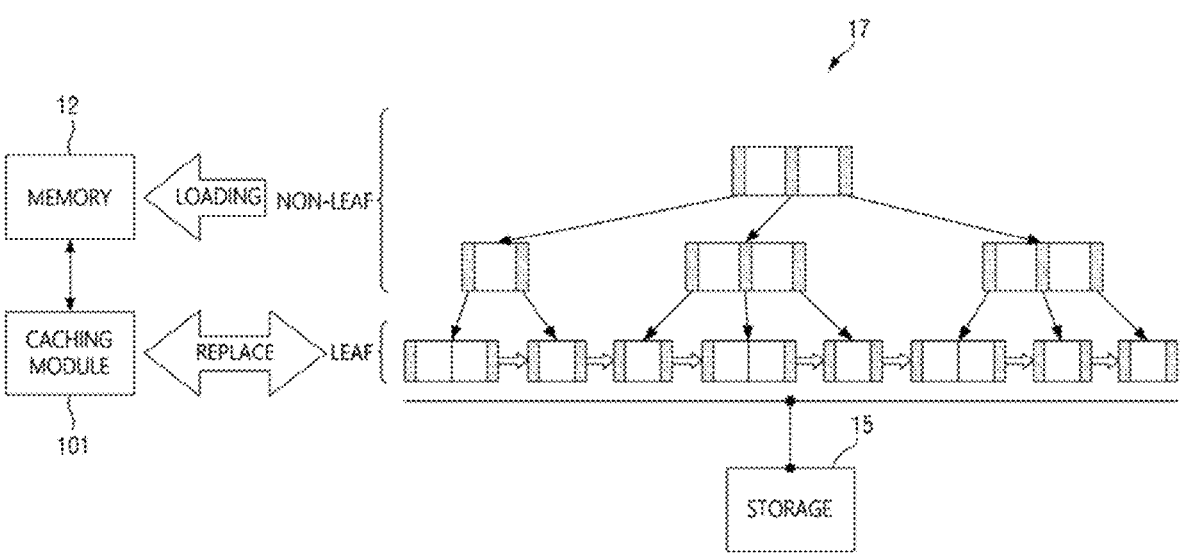
FIGS. 10 and 11 are example diagrams for explaining a method for operating a storage system when a memory capacity is insufficient, according to some embodiments.
Figure 11:
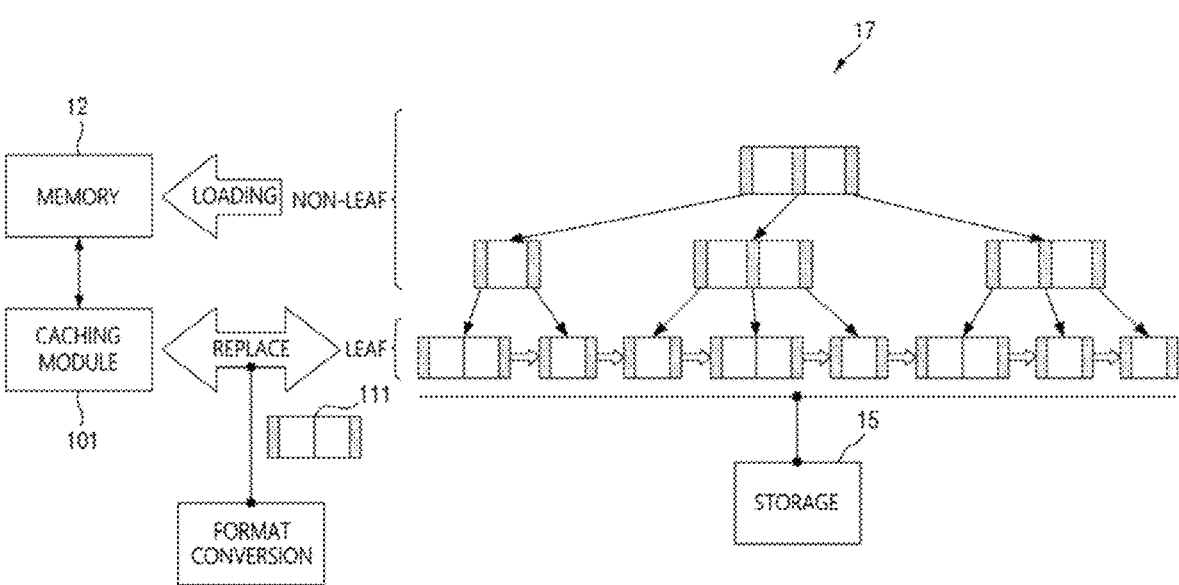

As shown in FIG. 10, if the capacity of the memory 12 is insufficient to load the entire address mapping tree 17, the processor 11 may load at least some of the non-leaf nodes of the address mapping tree 17 into the memory 12 (because non-leaf nodes have less data size and an access to the non-leaf node occurs much more frequently). In some embodiments, the processor 11 may load at least some of the leaf nodes into the memory 12. In some embodiments, the mapping information of the leaf node may be loaded into the memory 12 or evicted to the storage 15 by the caching module 101. Here, the caching module 101 refers to a module that operates on the basis of a cache replacement algorithm (e.g., LRU algorithm, etc.).

In such a case, the processor 11 may perform the format conversion on a particular leaf node, while the particular leaf node is being loaded or evicted by the caching module 101. This configuration and operation makes it possible to achieve the effect that the processing time for the format conversion is hidden in the input/output processing time of the storage 15. Specifically, the processor 11 may perform the format conversions on particular leaf nodes, while the mapping information of the particular leaf node is being loaded into the memory 12 from the storage 15 and/or while the mapping information of the particular leaf node is being evicted from the memory 12 to the storage 15.

The method for operating the storage system 10 associated with a case where the capacity of the memory 12 is insufficient has been described above with reference to FIGS. 10 and 11. Hereinafter, a method for operating the storage system 10 associated with the storage 15 that does not support in-place update will be described with reference to FIG. 12.

It is assumed that the storage 15 included in the storage system 10 is implemented as a non-volatile memory (or medium) that does not support in-place update (e.g., over-writing). Examples of such a memory may include a flash memory, but embodiments are not limited thereto.

In such a case, the processor 11 may update all ancestor nodes of the particular node together whenever an update occurs in the particular node.

Figure 12:
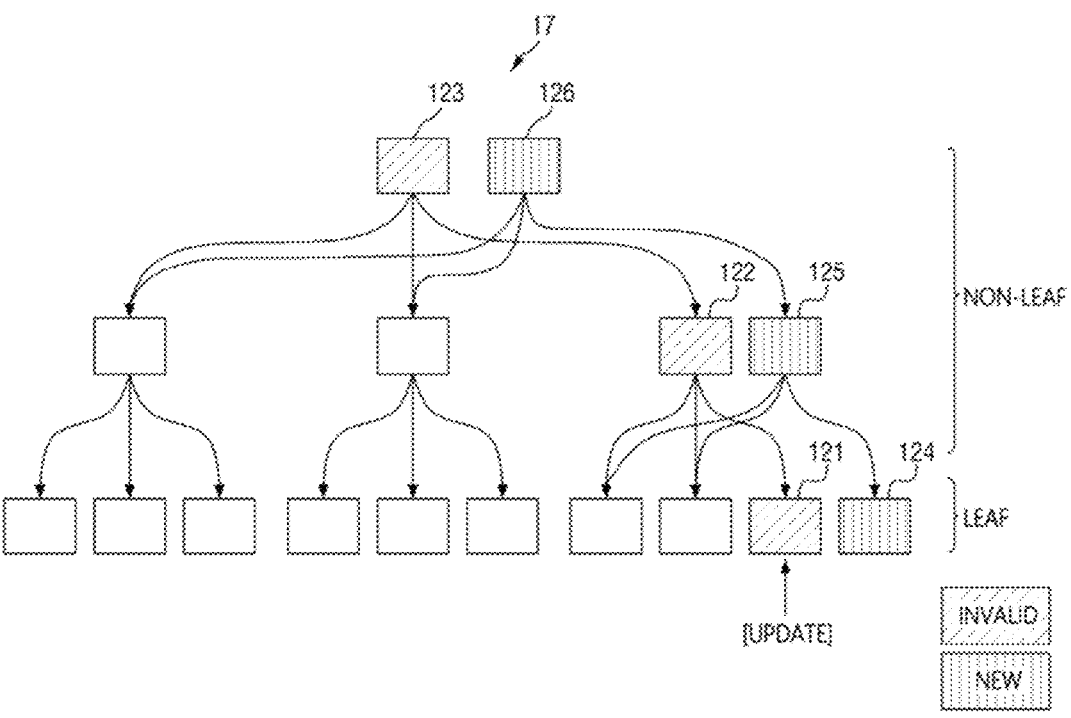
FIG. 12 is an example diagram for explaining a method for operating a storage system associated with a storage that does not support in-place updates according to some embodiments.

Specifically, as shown in FIG. 12, when an update (e.g., an entry addition, an entry correction, and/or an entry deletion, etc.) occurs in the mapping information of a particular leaf node 121, the processor 11 may generate a new leaf node 124 including the updated mapping information (because information correction of the leaf node 121 is not possible). Next, the processor 11 may generate new ancestor nodes 125 and 126 corresponding to each of all the ancestor nodes 122 and 123 of the particular leaf node 121 (because the information modification of the ancestor node (e.g., 122) is also not possible). The processor 11 may then store the new nodes 124 to 126 in the storage 15. By doing so, the address mapping tree 17 may be updated accurately and easily.

For reference, the data of the existing nodes 121 to 123 (e.g., physical pages in which the data is stored) is handled as invalid, and may be collected by a garbage collection technique.

The method for operating the storage system 10 associated with the storage 15 that does not support in-place update has been described above. A method for operating the storage system 10 associated with request processing of the storage client will be described below with reference to FIGS. 13 and 14.

Figure 13:
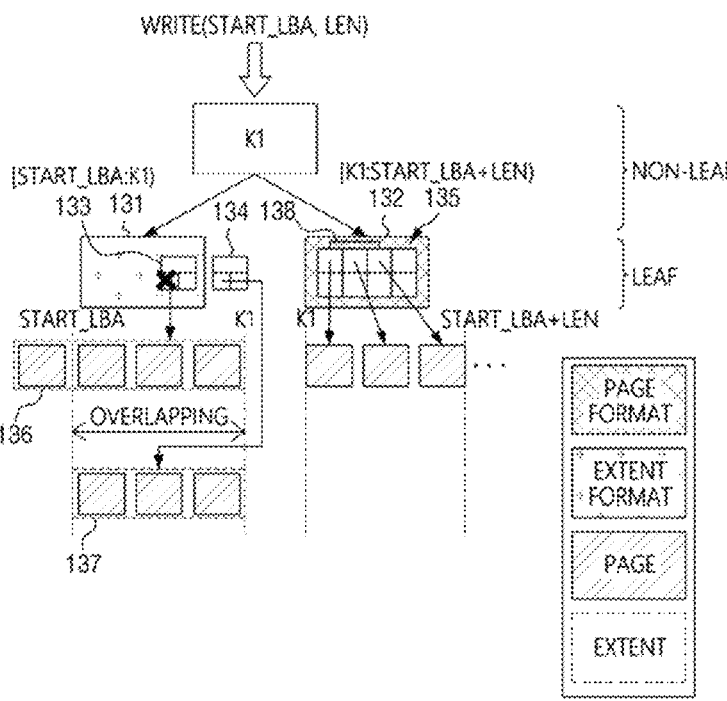
FIG. 13 is an example diagram for explaining a method for operating a storage system associated with write request processing according to some embodiments.

FIG. 13 is an example diagram for explaining a method for operating the storage system 10 associated with write request processing according to some embodiments.

As shown in FIG. 13, it is assumed that a write request is received from a storage client and that the logical address region of the write request is associated with two sibling nodes 131 and 132, (i.e., leaf nodes). Further, it is assumed that the mapping information formats of each of the first node 131 and the second node 132 are "extent format" and "page format", respectively. Hereinafter, for clarity of explanation, the logical address region (e.g., see '[START_LBA: K1]') of the write request associated with the first node 131 will be denoted as "a first region", and the logical address region (e.g., see "[K1:START_LBA+LEN)") of the write request associated with the second node 132 will be denoted as "a second region".

In such a case, the processor 11 may remove an entry 133 of one or more extents 136 having a region that overlaps the first region, among the entries included in the first node 131, and may insert a new entry 134 including the address mapping information of the first region (i.e., the new extent 137) into the first node 131. In some embodiments, the processor 11 may update the information of the existing entry 133 by using the address mapping information of the new extent 137 (e.g., if the number of entries to be removed and the number of entries to be inserted are equal, the entry information may also be updated). This configuration and operation makes it possible to accurately process the write requests of the storage client.

Next, the processor 11 may determine the entry 138 of the pages associated with the second area among the entries 138 included in the second node 132, and may process the write request to the second region by referring to the entries 138. In some embodiments, the processor 11 may update the address mapping information or bitmap, or the like of the entries 138 (e.g., update is performed when the physical address is changed, and the valid value of the bitmap is updated).

Figure 14:
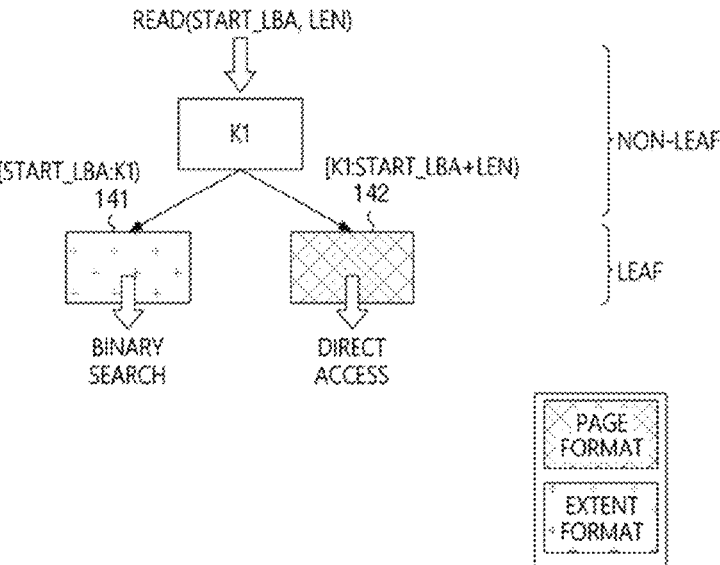
FIG. 14 is an example diagram for explaining a method for operating a storage system associated with read request processing according to some embodiments.

FIG. 14 is an example diagram for explaining a method for operating the storage system 10 associated with the read request processing according to some embodiments.

As shown in FIG. 14, it is assumed that a read request is received from a storage client and that the logical address region of the read request is associated with two sibling nodes 141 and 142 (i.e., leaf nodes). Further, it is assumed that the mapping information formats of the first node 141 and the second node 142 are "extent format" and "page format", respectively. Hereinafter, for clarity of explanation, the logical address region (e.g., see '[START_LBA:K1)') of the read request associated with the first node 141 will be denoted as "a first region", and the logical address region (e.g., see "[K1:START_LBA+LEN)") of the read request associated with the second node 142 will be denoted as "a second region".

In such a case, the processor 11 may search for the entries of the first node 141 (e.g., a plurality of extent entries arranged by logical address information) by a binary search scheme to perform the address conversion for the first region. The processor 11 may access the page entry of the second node 142 associated with the second region by a direct access scheme (e.g., access by using the logical page number as an index) to perform an address conversion on the second region. In other words, the processor 11 may access the page entry associated with the second region among the page entries of the second node 142 by the direct access scheme to perform the address conversion on the second region. This configuration and operation enables the read requests of the storage client to be processed accurately.

The operation of the storage system 10 associated with processing of storage client requests has been described above with reference to FIGS. 13 and 14. According to the contents mentioned above, even if the request of the storage client is associated with multiple nodes having different formats, the request may be processed accurately.

Various embodiments and effects of the various embodiments have been described above with reference to FIGS. 1 to 14.

According to some embodiments, the mapping information format of a particular node may be adaptively converted, on the basis of an average length of extents allocated to a logical address region (or a storage region) corresponding to a particular node (e.g., leaf node) of the address mapping tree. For example, when the average length of the extents is equal to or greater than a threshold, the mapping information format of the particular node may be converted into an extent-based format (hereinafter referred to as "extent format"), and when the average length of the extents is less than the threshold, the mapping information format of the particular node may be converted into a page-based format (hereinafter abbreviated as "page format"). In such a case, depending on the workload characteristics injected into the logical address region (or storage region), the mapping information format of the node that covers the region may be converted into an appropriate format (i.e., a format with less memory cost), and as a result, the overall memory cost for managing the address mapping information may be significantly reduced. Furthermore, even when multiple tenants use different regions of storage, address mapping information of the storage may be efficiently managed depending on the workload characteristics of the tenants.

If the particular node is in a full state and an extent entry is inserted into the particular node, node splitting (or division) is deferred until a later specific point in time and format conversion may be performed on the address mapping information of the particular node. In this case, processing costs for the node splitting (or division) and format conversion may be reduced.

By comprehensively considering the size of extent entry and the size of page entry, it is possible to accurately determine the threshold that serves as a standard for format conversion.

Format conversion may be performed on the address mapping information of the particular node, while the address mapping information of the particular node is loaded into the memory or evicted to the storage. In this case, it is possible to achieve the effect that the processing time for format conversion is hidden in the input/output processing time of the storage.

By performing node merging when the average extent length of a virtual merging node is equal to or greater than a threshold, the frequency of format conversions may be reduced (i.e., the overall processing cost due to format conversions is reduced). Since the merged nodes are started in the extent format, the overall memory cost for managing the address mapping information may be further reduced.

When an update occurs in the particular node of the address mapping tree, a new node may be generated for the particular node, and a new ancestor node corresponding to the ancestor node may also be generated. The generated new nodes may then be stored in the storage. In such a case, update of the address mapping tree may be performed accurately, even if the storage is implemented as a non-volatile memory that does not support in-place update.

By applying a binary search scheme to the node of extent formats and applying a direct access scheme to the node of page format, read requests of the storage clients may be processed accurately and easily.

It is possible to accurately and easily process the write request of the storage client, by removing existing extent entry having a region that overlaps the logical address region of write request, and by inserting a new extent entry into the particular node.

The advantages according to the technical idea of the present disclosure are not limited to the above advantages, and other advantages not mentioned will be clearly understood by those skilled in the art from the following description.

The technology described above may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as internet and installed in the other computing device, thereby being used in the other computing device.

Although operations are shown in a specific order in the drawings, it should not be understood that desired results may only be obtained when the operations are performed in the specific order or sequential order or when all of the operations are performed. In certain embodiments, multitasking and parallel processing may be advantageous and employed. According to the above-described embodiments, it will be understood that the described program components and systems may generally be integrated together into a single software product or be packaged into multiple software products.

Those skilled in the art will appreciate that many variations and modifications may be made to the example embodiments without substantially departing from the principles of the present disclosure. Therefore, the example embodiments described are used in a generic and descriptive sense only and not for purposes of limitation, the scope of the embodiments being defined by the appended claims.

What is claimed is:

1. A storage system comprising:
one or more processors; and
a storage that is implemented as a non-volatile memory and that stores one or more computer programs,
wherein at least one of the one or more processors accesses the storage and executes the one or more computer programs to cause the at least one of the one or more processors to perform a calculation of an average length of extents allocated to a logical address region corresponding to a particular node of an address mapping tree, the address mapping tree being associated with the storage, and a mapping information format of the particular node being a first format; and
the at least one of the one or more processors accesses the storage and executes the one or more computer programs to cause the at least one of the one or more processors to perform a format conversion based on the average length, the format conversion converting the mapping information format of the particular node from the first format to a second format.

2. The storage system of claim 1,
wherein the address mapping tree is a B+ tree, and
the particular node is a leaf node of the address mapping tree.

3. The storage system of claim 1,
wherein a size of the logical address region is dynamically determined by an allocation process of the extents.

4. The storage system of claim 1, wherein the average length calculation comprises:
calculating the average length of the extents based on a size of the logical address region and based on a number of the extents allocated to the logical address region.

5. The storage system of claim 4,
wherein the address mapping tree is a sorting tree based on logical address information, and
the size of the logical address region is calculated based on a difference between first logical address information of a first entry of the particular node and second logical address information of a first entry of a sibling node to the particular node.

6. The storage system of claim 4,
wherein the first format is an extent-based format in which each entry of a node corresponds to an individual extent, and
the number of the extents is determined by a number of entries included in the particular node.

7. The storage system of claim 4,
wherein the first format is a page-based format that includes a bitmap to manage validity information of a page, and
the average length calculation comprises:
determining the number of the extents by counting a number of page sets made up of consecutive valid pages by using the bitmap.

8. The storage system of claim 1,
wherein the first format is an extent-based format,
the second format is a page-based format, and
the format conversion is performed in response to the average length being less than a threshold.

9. The storage system of claim 8,
wherein, in response to a number of entries of the particular node being a maximum number and an entry of a new extent being inserted into the particular node, splitting for the particular node is deferred and the format conversion is performed.

10. The storage system of claim 8,
wherein an entry of the first format includes address mapping information of an individual extent,
an entry of the second format includes address mapping information of an individual page, and
the threshold is based on an entry size of the first format and an entry size of the second format.

11. The storage system of claim 8,
wherein the threshold is based on a request processing speed associated with a storage client.

12. The storage system of claim 1,
wherein the first format is a page-based mapping format,
the second format is an extent-based mapping format, and
the format conversion is performed in response to the average length being equal to or greater than a threshold.

13. The storage system of claim 1, further comprising a volatile memory,
wherein the format conversion is performed while mapping information of the particular node is being loaded from the storage to the volatile memory, or while the mapping information of the particular node is being evicted from the volatile memory to the storage, performing the format conversion.

14. The storage system of claim 1,
wherein the address mapping tree includes a first node of an extent-based format, and a second node that is a sibling node of the first node, and
the at least one of the one or more processors is configured to access the storage and execute the one or more computer programs to cause the at least one of the one or more processors to:
when merging between the first node and the second node is to be performed due to a constraint of the address mapping tree:
generate a virtual merging node of the first node and the second node, a mapping information format of the second node being different from a mapping information format of the first node;

determine an average length of an extent allocated to a logical address region corresponding to the virtual merging node;

defer the merging in response to the determined average length being less than a threshold; and merge the first node and the second node to generate a merged node of the extent-based format in response to the determined average length being equal to or greater than the threshold.

15. The storage system of claim 1, wherein the address mapping tree includes a first node and a second node that is a sibling node of the first node, a mapping information format of the first node and a mapping information format of the second node are a page-based format and an extent-based format, respectively, and the at least one of the one or more processors is configured to access the storage and execute the one or more computer programs to cause the at least one of the one or more processors to:

when an entry movement from the first node to the second node is to be performed due to a constraint of the address mapping tree:

determine an extent of the first node that is located closest to an extent managed by the second node based on mapping information of the first node; and generate an entry including address mapping information of the determined extent and insert the generated entry into the second node.

16. The storage system of claim 1, wherein the address mapping tree includes a first node of an extent-based format, and the at least one of the one or more processors is configured to access the storage and execute the one or more computer programs to cause the at least one of the one or more processors to:

receive a write request from a storage client, a logical address region of the write request including a first region associated with the first node;

remove an entry of an extent having a region that overlaps the first region, among entries included in the first node; and insert a new entry including address mapping information of the first region into the first node.

17. The storage system of claim 1, wherein the address mapping tree includes a first node and a second node that is a sibling node of the first node, mapping information of the first node includes a plurality of sorted extent entries, mapping information of the second node includes a plurality of page entries that support a direct access, and wherein the at least one of the one or more processors is configured to access the storage and execute the one or more computer programs to cause the at least one of the one or more processors to:

receive a read request from a storage client, a logical address region of the read request including a first region associated with the first node and a second region associated with the second node;

search the plurality of sorted extent entries of the first node in a binary search scheme to perform an address conversion on the first region; and access a page entry associated with the second region among the plurality of page entries in a direct access scheme to perform an address conversion on the second region.

18. The storage system of claim 1, wherein the non-volatile memory does not support in-place update, and the at least one of the one or more processors is configured to access the storage and execute the one or more computer programs to cause the at least one of the one or more processors to:

when mapping information of a first node included in the address mapping tree is updated:

generate a second node including the updated mapping information;

generate an ancestor node of the second node corresponding to an ancestor node of the first node; and store mapping information of the second node and mapping information of the ancestor node of the second node in the storage.

19. A method for operating a storage system including a storage, the method comprising:

calculating an average length of extents allocated to a logical address region corresponding to a particular node of an address mapping tree, the address mapping tree being associated with the storage, and a mapping information format of the particular node being a first format; and based on the average length, converting the mapping information format of the particular node from the first format to a second format.

20. A non-transitory computer-readable storage medium configured to store instructions which, when executed by one or more processors, cause the one or more processors to at least:

calculate an average length of extents allocated to a logical address region corresponding to a particular node of an address mapping tree, the address mapping tree being associated with a storage cooperating with the one or more processors, and a mapping information format of the particular node being a first format; and convert, based on the average length, the mapping information format of the particular node from the first format to a second format.

* * * * *